(12) United States Patent
Yokoyama

(10) Patent No.: US 10,426,150 B2
(45) Date of Patent: Oct. 1, 2019

(54) TUBULAR STRUCTURE HAVING DECORATIVE LAYER AND METHOD OF FORMING DECORATIVE LAYER ON TUBULAR STRUCTURE

(71) Applicant: Globeride, Inc., Tokyo (JP)

(72) Inventor: Yuji Yokoyama, Tokyo (JP)

(73) Assignee: Globeride, Inc., Tokyo (JP)

( * ) Notice: Subject to any disclaimer, the term of this patent is extended or adjusted under 35 U.S.C. 154(b) by 404 days.

(21) Appl. No.: 15/046,136

(22) Filed: Feb. 17, 2016

(65) Prior Publication Data

US 2016/0286770 A1    Oct. 6, 2016

(30) Foreign Application Priority Data

Mar. 31, 2015    (JP) .................. 2015-073073

(51) Int. Cl.
*A01K 87/00* (2006.01)
*B41J 2/21* (2006.01)
*B41J 3/407* (2006.01)

(52) U.S. Cl.
CPC ............. *A01K 87/00* (2013.01); *B41J 2/2132* (2013.01); *B41J 3/4073* (2013.01)

(58) Field of Classification Search
CPC ...... A01K 87/00; A01K 87/02; A01K 87/005; A01K 87/025
(Continued)

(56) References Cited

U.S. PATENT DOCUMENTS 1,306,310 A * 6/1919 Morris .................. D04H 13/00
                                                    43/18.5
1,318,421 A * 10/1919 Welles ................... A01K 87/00
                                                    43/18.1 R
(Continued)

FOREIGN PATENT DOCUMENTS

CN    101248779 A    8/2008
DE    4424528          1/1996
(Continued)

OTHER PUBLICATIONS

Translation of JP04-169144.*
(Continued)

*Primary Examiner* — Darren W Ark
(74) *Attorney, Agent, or Firm* — DLA Piper LLP (US)

(57) ABSTRACT

Provided are a tubular structure having an aesthetically fine decorative layer with which borders of the layers in a circumferential direction are obscured, and a method of forming such a decorative layer on the tubular structure. The decorative layer includes axial-direction decorative rows arranged in a circumferential direction of a tubular body of the tubular structure. Each axial-direction decorative row includes covering regions that make a surface of the tubular body structure invisible and exposing regions that make the surface of the tubular body visible, and the covering and exposing regions are alternately arranged along an axial direction of the tubular body. An axial-direction decorative row has the exposing regions arranged such that a portion of the covering region in the next axial-direction decorative rows in the circumferential direction is partially situated between the two axially adjacent covering regions in the axial-direction decorative row with a clearance therebetween.

10 Claims, 5 Drawing Sheets

(58) Field of Classification Search
USPC .............. 43/18.1 R, 18.5, 18.1 CT, 18.1 HR; 347/41; D22/142, 137
See application file for complete search history.

(56) References Cited

U.S. PATENT DOCUMENTS

| | | | | |
|---|---|---|---|---|
| D101,218 S * | 9/1936 | Gurrieri | ...................... | D22/142 |
| 2,167,390 A * | 7/1939 | Green | ...................... | D04B 9/28 |
| | | | | 66/135 |
| 2,522,265 A * | 9/1950 | Haddad | ................... | D04B 1/26 |
| | | | | 66/180 |
| 3,124,948 A * | 3/1964 | Levin | ...................... | D04B 9/28 |
| | | | | 66/179 |
| 3,186,122 A * | 6/1965 | Clock | ................... | A01K 87/00 |
| | | | | 43/18.5 |
| 4,212,693 A * | 7/1980 | Saito | ...................... | A01K 87/00 |
| | | | | 156/173 |
| 4,287,244 A * | 9/1981 | McMahon, Jr. | ........ | B31C 13/00 |
| | | | | 101/483 |
| 4,304,620 A * | 12/1981 | Ashby | .................... | A01K 87/00 |
| | | | | 156/172 |
| 4,442,981 A * | 4/1984 | Cope | ...................... | B65H 81/08 |
| | | | | 242/423.2 |
| 4,653,216 A * | 3/1987 | Inoue | .................... | A01K 87/00 |
| | | | | 43/18.5 |
| D290,734 S * | 7/1987 | Matsui | ...................... | D22/142 |
| D290,735 S * | 7/1987 | Matsui | ...................... | D22/142 |
| D290,882 S * | 7/1987 | Inoue | ...................... | D22/142 |
| D291,834 S * | 9/1987 | Matsui | ...................... | D22/142 |
| D294,284 S * | 2/1988 | Andreasen | .................. | D22/142 |
| D295,999 S * | 5/1988 | Inoue | ...................... | D22/142 |
| 5,090,149 A * | 2/1992 | Muk Kim | .............. | A01K 87/00 |
| | | | | 43/18.1 R |
| D349,748 S * | 8/1994 | Lucero | ...................... | D22/142 |
| 5,583,550 A * | 12/1996 | Hickman | ............... | B41J 2/2054 |
| | | | | 347/41 |
| 5,633,663 A * | 5/1997 | Matsubara | ............. | B41J 19/147 |
| | | | | 347/12 |
| 5,665,441 A * | 9/1997 | Suzue | .................... | A01K 87/00 |
| | | | | 428/34.7 |
| 6,003,263 A * | 12/1999 | Thurber | ................ | A01K 87/00 |
| | | | | 43/18.1 R |
| 6,088,947 A * | 7/2000 | Suzue | .................... | A01K 87/00 |
| | | | | 43/18.1 R |
| 6,130,685 A * | 10/2000 | Matsubara | ............. | B41J 19/147 |
| | | | | 347/41 |
| 6,164,745 A * | 12/2000 | Nagoshi | ................ | B41J 19/142 |
| | | | | 347/15 |
| 6,301,821 B1 * | 10/2001 | Suzue | .................... | A01K 87/00 |
| | | | | 43/18.1 R |
| 6,341,840 B1 * | 1/2002 | van Doorn | ............ | B41J 19/147 |
| | | | | 347/12 |
| 6,406,111 B1 * | 6/2002 | Klassen | ................ | B41J 2/5056 |
| | | | | 347/15 |
| 6,478,394 B1 * | 11/2002 | Okamoto | ............... | B41J 2/2132 |
| | | | | 347/15 |
| 7,559,618 B2 * | 7/2009 | Oh | ........................... | B41J 2/205 |
| | | | | 347/15 |
| 7,686,414 B2 * | 3/2010 | Korem | ................... | B41J 11/001 |
| | | | | 347/19 |
| 7,753,307 B2 * | 7/2010 | Alho | ...................... | A01K 87/02 |
| | | | | 242/443 |
| 8,451,493 B2 * | 5/2013 | Noguchi | .............. | H04N 1/4055 |
| | | | | 347/12 |
| 8,499,487 B2 * | 8/2013 | Huang | ................... | A01K 87/08 |
| | | | | 43/18.1 R |
| 8,534,788 B2 * | 9/2013 | Masada | ................. | B41J 29/38 |
| | | | | 347/12 |
| 9,010,014 B2 * | 4/2015 | Iwanari | ................ | A01K 87/00 |
| | | | | 43/18.5 |
| 10,105,976 B2 * | 10/2018 | Yoshikawa | ............ | B41J 2/2121 |
| 2003/0235671 A1 * | 12/2003 | Sano | ...................... | A01K 87/00 |
| | | | | 428/36.91 |
| 2006/0251877 A1 * | 11/2006 | Pirazzini | ................ | A01K 87/00 |
| | | | | 428/292.1 |
| 2010/0077649 A1 * | 4/2010 | Giacobbe | ............... | A01K 87/00 |
| | | | | 43/25 |
| 2011/0181897 A1 * | 7/2011 | Noguchi | ............... | G06K 15/107 |
| | | | | 358/1.9 |
| 2011/0249298 A1 * | 10/2011 | Gullentops | ......... | B29C 67/0059 |
| | | | | 358/1.18 |
| 2013/0239456 A1 * | 9/2013 | Leffler | ................... | A01K 87/04 |
| | | | | 43/23 |

FOREIGN PATENT DOCUMENTS

| | | | | |
|---|---|---|---|---|
| EP | 1 998 274 | | 2/2008 | |
| EP | 2708618 B1 * | | 8/2016 | ............ A01K 87/00 |
| GB | 2177883 A * | | 2/1987 | ............ A01K 87/00 |
| GB | 2448963 A * | | 11/2008 | ............ B41J 3/4073 |
| GB | 2510974 A * | | 8/2014 | ............ A01K 87/00 |
| GB | 2511904 | | 9/2014 | |
| GB | 2511904 A | | 9/2014 | |
| GB | 2511905 A * | | 9/2014 | ............ B41M 3/06 |
| JP | 62016132 A * | | 1/1987 | ............ A01K 87/00 |
| JP | 04-169144 A | | 6/1992 | |
| JP | 04169144 A * | | 6/1992 | |
| JP | 08-207265 | | 8/1996 | |
| JP | 08207265 A * | | 8/1996 | ............ B41J 3/4073 |
| JP | 09-23789 | | 1/1997 | |
| JP | 09023789 A * | | 1/1997 | |
| JP | 2002001849 A * | | 1/2002 | |
| JP | 2002191259 A * | | 7/2002 | |
| JP | 2007289082 A * | | 11/2007 | |
| JP | 4087573 B2 * | | 5/2008 | |
| JP | 2008-206415 | | 9/2008 | |
| JP | 2008206415 A * | | 9/2008 | |
| JP | 2009178133 A * | | 8/2009 | |
| JP | 2009240280 A * | | 10/2009 | |
| JP | 2010-143200 | | 7/2010 | |
| JP | 2010143200 A * | | 7/2010 | |
| JP | 2011019875 A * | | 2/2011 | |
| JP | 2013059352 A * | | 4/2013 | |
| JP | 2014-124177 A | | 7/2014 | |
| JP | 2014124148 A * | | 7/2014 | ............ B41M 3/06 |
| JP | 2014124176 A * | | 7/2014 | ............ A01K 87/00 |
| JP | 2014124177 A * | | 7/2014 | ............ A01K 87/00 |
| JP | 2015065916 A * | | 4/2015 | |
| JP | 5973906 B2 * | | 8/2016 | ............ A01K 87/00 |
| JP | 2016185165 A * | | 10/2016 | |
| JP | 2017023148 A * | | 2/2017 | |
| JP | 6211765 B2 * | | 10/2017 | ............ B41M 3/06 |
| JP | 6336803 B2 * | | 6/2018 | |
| KR | 101335335 B1 * | | 12/2013 | |
| KR | 10-2014-0085319 | | 7/2014 | |
| KR | 20140085318 A * | | 7/2014 | ............ A01K 87/00 |
| KR | 20140143923 A * | | 12/2014 | |
| WO | WO-2009123624 A1 * | | 10/2009 | ........ B05B 12/122 |
| WO | WO-2012153778 A1 * | | 11/2012 | ............ A01K 87/00 |

OTHER PUBLICATIONS

Korean Office Action dated Feb. 27, 2017 for Appln. No. 10-2016-0013858.
Extended European Search Report dated Aug. 30, 2016 for Appln. No. 16159665.5.
Non-final Office Action Japanese Patent Application No. 2015-073073 dated Jan. 18, 2018 with English translation.
"Lunatic Daily Life of Lunatic Crew—Decorative Winding on a Rod," [online], Feb. 11, 2012, [Dec. 28, 2017], the Internet, <URL: http://lunaticcrew.seesaa.net/category/12675101-1.html> with English translation.
Decision of Refusal Japanese Patent Application No. 2015-073073 dated Aug. 30, 2018 with English translation.
Communication pursuant to Article 94(3) EPC—EP Application No. 16 159 665.5 dated Nov. 13, 2018.
First Office Action dated Dec. 14, 2018 issued in corresponding Chinese Patent Application No. 201610133115.7 with English translation.

(56) References Cited

OTHER PUBLICATIONS

The Second Office Action dated Jul. 18, 2019, of counterpart Chinese Application No. 201610133115.7, along with an English translation.

* cited by examiner

TUBULAR STRUCTURE HAVING DECORATIVE LAYER AND METHOD OF FORMING DECORATIVE LAYER ON TUBULAR STRUCTURE

CROSS-REFERENCE TO RELATED APPLICATIONS

This application is based on and claims the benefit of priority from Japanese Patent Application Serial No. 2015-73073 (filed on Mar. 31, 2015), the contents of which are hereby incorporated by reference in their entirety.

TECHNICAL FIELD

The present disclosure relates to a tubular structure having a decorative layer on the surface thereof, and to a method of forming a decorative layer on the tubular structure.

BACKGROUND

Various products on the market are provided with various decorations. Decorations may be formed by printing a decorative layer on products through ink-jet printing, screen printing, pad printing or the like. For example, some of fishing rods, a sort of products on the market, are provided with a decorative layer on the surface thereof through ink-jet printing so as to cover various user preferences or to stimulate user interest (see, e.g., Japanese Patent Application Publication No. 2008-206415 and Japanese Patent Application Publication No. H. 9-23789). Further, many techniques have been proposed for providing decoration on tubular products other than fishing rods by ink-jet printing (see, e.g., Japanese Patent Application Publication No. 2010-143200).

The ink-jet printing mentioned above is one of printing methods using printers, wherein liquid ink particles are discharged onto a printing substrate to draw dots that collectively represent characters and figures. However, there are some drawbacks when printing a decorative layer on a tubular body by ink-jet printing; and the drawbacks are specific to tubular bodies.

For instance, when a decorative layer is printed on a surface of a fishing rod, which is an example of the above-mentioned tubular structure, by ink-jet printing, more specifically, when a decorative layer is printed by ink-jet printing in several steps in the circumferential direction of the rod, circumferential borders (seams) between the divided decorative layers printed in the above steps may not be made continuously due to characteristics of an ink-jet printing machine or due to an axial tapering configuration of the fishing rod. In particular, at the border (seam) between the first divided decorative layer printed in the first circumferential step and the last divided decorative layer printed in the last circumferential step, the edges of these divided decorative layers may be largely separated or largely overlapped from/with each other in the circumferential direction due to the accumulation of small errors at each printing step. The separations or overlaps appear as streaky lines along the axial direction of the rod on the surface of the rod, which impairs the decorative appearance.

Not only in the ink-jet printing, such errors at the borders between the decorative layers may also happen in various printing methods such as screen printing and pad printing.

SUMMARY

The present disclosure addresses the above drawbacks. One object of the present disclosure is to provide a tubular structure having an aesthetically fine decorative layer with which borders of the layers in a circumferential direction are obscured, and a method of forming such a decorative layer on the tubular structure.

The present disclosure provides a tubular structure that includes a tubular body and a decorative layer formed on a surface of the tubular body in a prescribed portion. The decorative layer has a lattice-like pattern in which first regions of a first color and second regions of a second color different from the first color are alternately arranged in an axial direction and a circumferential direction of the tubular body. The decorative layer includes axial-direction decorative rows arranged in the circumferential direction of the tubular body. Each of the axial-direction decorative rows includes the first regions having a first prescribed shape and the second regions having a second prescribed shape that are alternately arranged along the axial direction of the tubular body. The second regions in each axial-direction decorative row are formed such that the first region in one axial-direction decorative row is partially situated between two axially-adjacent first regions in a next axial-direction decorative row adjacent to the one axial-direction decorative row in the circumferential direction with a clearance interposed therebetween.

According to the tubular structure, each axial-direction decorative row includes the first regions and the second regions alternately arranged along the axial direction of the tubular body. Each of the second regions is formed such that the first region in one axial-direction decorative row is partially situated between the two axially adjacent first regions in the next axial-direction decorative row next to the one axial-direction decorative row in the circumferential direction with a clearance interposed therebetween. In this manner, the axial-direction decorative rows situated next to each other in the circumferential direction are arranged to be mixed via the first regions (the axial-direction decorative rows adjacent in the circumferential direction are mingled). Therefore, even if the axial-direction decorative rows are separated or overlapped from/with each other in the circumferential direction, the separation or the overlapped portion will not be appear as a streaky line extending along the axial direction of the tubular body on the surface thereof and the borders between the axial-direction decorative rows can be obscured. In this way, it is possible to provide an aesthetically fine decorative layer in which borders in a circumferential direction are obscured.

According to the disclosure, provided are a tubular structure having an aesthetically fine decorative layer with which borders of the layers in a circumferential direction are obscured, and a method of forming such a decorative layer on the tubular structure.

BRIEF DESCRIPTION OF THE DRAWINGS

FIG. 2a is a plan view of a conventional decorative layer (a checkerboard pattern) including black-colored squares which are covering regions and transparent squares which are exposing regions and arranged in a lattice-like pattern. The plan view illustrates a state where decorative rows extending in the axial direction separate from each other in the circumferential direction. FIG. 2b is a plan view illustrating a state of the decorative layer same as FIG. 2a in which axial-direction decorative rows are correctively arranged in the circumferential direction. FIG. 2c is a plan view illustrating a state of the same decorative layer as FIG. 2a in which the axial-direction decorative rows are overlapped from each other in the circumferential direction. FIG. 2d is a plan view of a decorative layer according to a first embodiment of the invention having an argyle pattern consisting of black-colored diamonds that are the covering regions and transparent X patterns that are the exposing regions. The plan view illustrates a state where the decorative rows extending in the axial direction separate from each other in the circumferential direction. FIG. 2e is a plan view illustrating a state of the decorative layer same as FIG. 2d in which the decorative rows extending in the axial direction are correctively arranged in the circumferential direction. FIG. 2f is a plan view illustrating a state of the decorative layer same as FIG. 2d in which the decorative rows extending in the axial direction are overlapped from each other in the circumferential direction.

FIG. 3a is a plan view of a conventional decorative layer (a checkerboard pattern) including black-colored squares which are the covering regions and transparent squares which are exposing regions and arranged in a lattice-like pattern. The plan view illustrates a state where decorative rows extending in the axial direction separate from each other in the circumferential direction. FIG. 3b is a plan view illustrating a state of the same decorative layer as FIG. 3a in which decorative rows extending in the axial direction are correctively arranged in the circumferential direction. FIG. 3c is a plan view illustrating a state of the same decorative layer same as FIG. 3a in which decorative rows extending in the axial direction are overlapped from each other in the circumferential direction. FIG. 3d is a plan view of a decorative layer according to a second embodiment of the invention having a lattice-like pattern consisting of black-colored hexagons which are the covering regions and transparent irregular squires (a square with V-shaped branches from their opposite sides in the circumferential direction) which are the exposing regions. The plan view illustrates a state where decorative rows extending in the axial direction separate from each other in the circumferential direction. FIG. 3e is a plan view illustrating a state of the decorative layer same as FIG. 3d in which decorative rows extending in the axial direction are correctively arranged in the circumferential direction. FIG. 3f is a plan view illustrating a state of the same decorative layer same as FIG. 3d in which decorative rows extending in the axial direction are overlapped from each other in the circumferential direction.

FIG. 4a is a plan view of a larger area of the decorative layer schematically illustrating a streaky line along the axial direction of a tubular structure on the surface, which is the separation in the circumferential direction between the axially-extending decorative rows as a result of the states shown in FIGS. 2a and 3a. FIG. 4b is a plan view of a larger area of the decorative layer of FIGS. 2b and 3b. FIG. 4c is a plan view of a larger area of the decorative layer schematically illustrating a streaky line along the axial direction of the tubular structure on the surface, which is the overlap in the circumferential direction between the axially-extending decorative rows as a result of the states shown in FIGS. 2c and 3c.

DESCRIPTION OF THE PREFERRED EMBODIMENTS

An embodiment of a tubular structure having a decorative layer according to the present invention and a method of forming the decorative layer on a tubular structure will be described with reference to the drawings.

Figure 1:
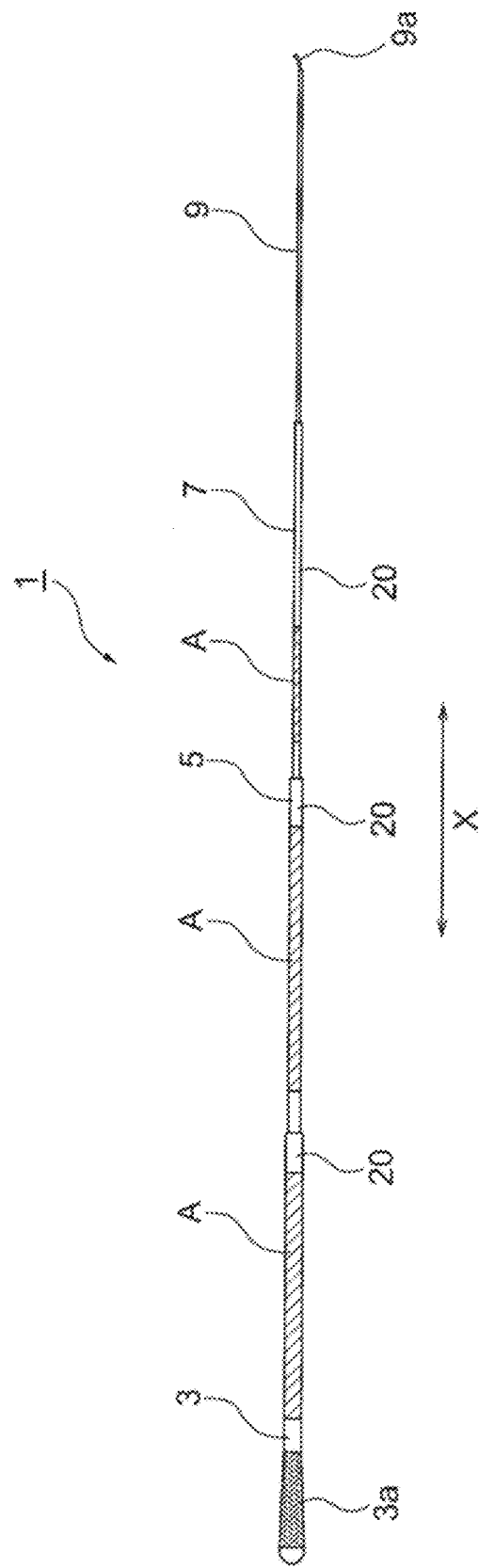
FIG. 1 is a side view of a fishing rod as an example of a tubular structure of the present invention.

FIG. 1 shows a fishing rod 1 as an example of a tubular structure of the present invention. As shown, the fishing rod 1 comprises a plurality of rods as tubular bodies, that is, a base rod 3 having a grip 3a, a first intermediate rod 5, a second intermediate rod 7, and a tip top rod 9 having a fishline fastener 9a. In this case, the rods 3, 5, 7, 9 may be arranged to be telescopic or ordinarily jointed; and tubular bodies 20 of the rods 3, 5, 7, 9 may be formed by winding a fiber-reinforced prepreg (fiber reinforced resin material) made of reinforced fibers (carbon fibers, in this embodiment) impregnated with a synthetic resin. The rods 3, 5, 7, 9 may be provided with a decorative layer A extending the entire or part of the lengths of the rods.

In the embodiment, fibers of the fiber reinforced resin material forming the tubular body 20 are not woven (for example, in a lattice pattern) and the fibers are exposed on the surface of the tubular body 20 and extend only along, for instance, the longitudinal axial direction of the tubular body. This is because the embodiment tries to realize a false pattern of a lattice pattern of finely-woven carbon fiber by using the decorative layer A which is not expensive. It is possible to make the rods attractive by showing, with the decorative layer A, that the rods are made of carbon and the carbon fibers are finely woven (fineness). Consequently, the rods may attract more consumers due to its appearance just like expensive rods. Alternatively, the fibers of the tubular body 20 may nonetheless extend in various directions other than the longitudinal axial direction or mixed directions or may be woven. The decorative layer A in the embodiment is formed by ink-jet printing, which will be described later. However, the decorative layer A may be formed in a lattice pattern alternatively by other printings such as screen printing and pad printing, or by placing stickers.

As described above, the decorative layer A is provided on the outer surfaces of the tubular bodies 20 of the rods 3, 5, 7, and 9. Referring to FIGS. 2a to 2c and FIGS. 3a to 3c, in a conventional decorative layer A' (whereas a decorative layer according to the embodiment will be denoted simply as "A"), square covering regions 100 (for example, black-colored layers) that hide the surface of the tubular body 20, and square exposing regions 102 (for example, transparent layers) that allow the surface of the tubular body 20 to be visible are alternately arranged in an axial direction X and a circumferential direction Y of the tubular bodies 20 to form a lattice-like pattern (a checkerboard pattern). More specifically, the decorative layer A' includes axial-direction decorative rows R (R1, R2, R3, R4, . . . ) in which the square covering regions 100 and the square exposing regions 102 are alternately arranged in the axial direction X of each tubular body 20. The axial-direction decorative rows R are arranged in the circumferential direction Y of the tubular body 20.

When the axial-direction decorative rows R are printed one by one or two or more of the rows are printed at once by ink-jet printing in several steps in the circumferential direction of the rods 3, 5, 7, and 9, borders (seams) in the circumferential direction between the divided decorative layers (the axial-direction decorative rows R) printed in the above steps may not be well aligned due to characteristics of an ink-jet printing machine or due to axial tapering configurations of the rods 3, 5, 7, and 9. In particular, at the border (seam) between the first divided decorative layer (the axial-direction decorative row R) printed in the first circumferential step and the last divided decorative layer (the axial-direction decorative row R) printed in the last circumferential step, the edges of these divided decorative layers (the axial-direction decorative rows R) may be largely separated or largely overlapped from/with each other in the circumferential direction due to the accumulation of small errors at each printing step. The separation or overlap is looked like a streaky line along the axial direction of the rod on the surface of the rod, which impairs the decorative appearance.

Figure 2:
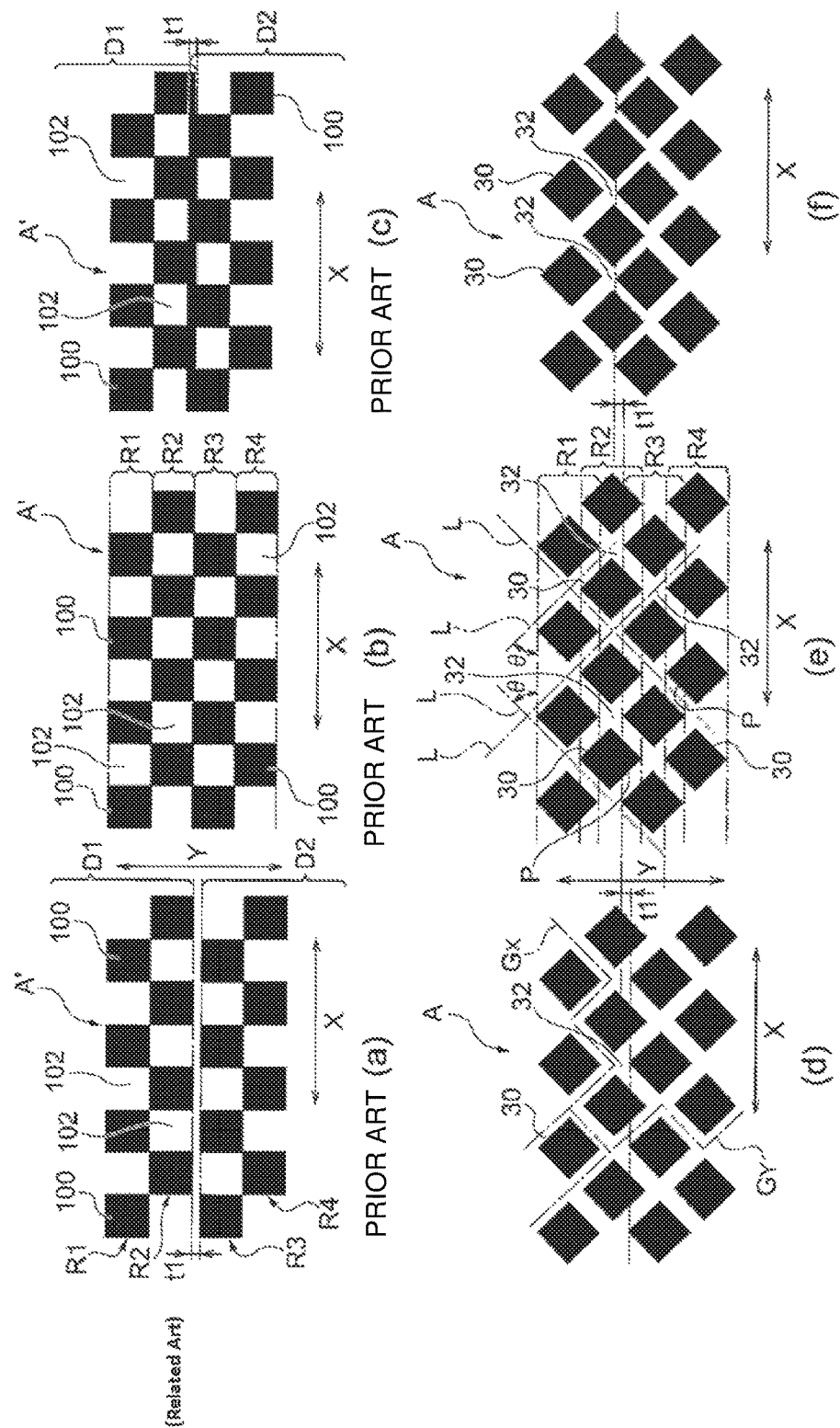
FIGS. 2a-2f illustrates an example of a decorative layer which may be provided on an outer surface of the fishing rod of FIG. 1.
Figure 4:
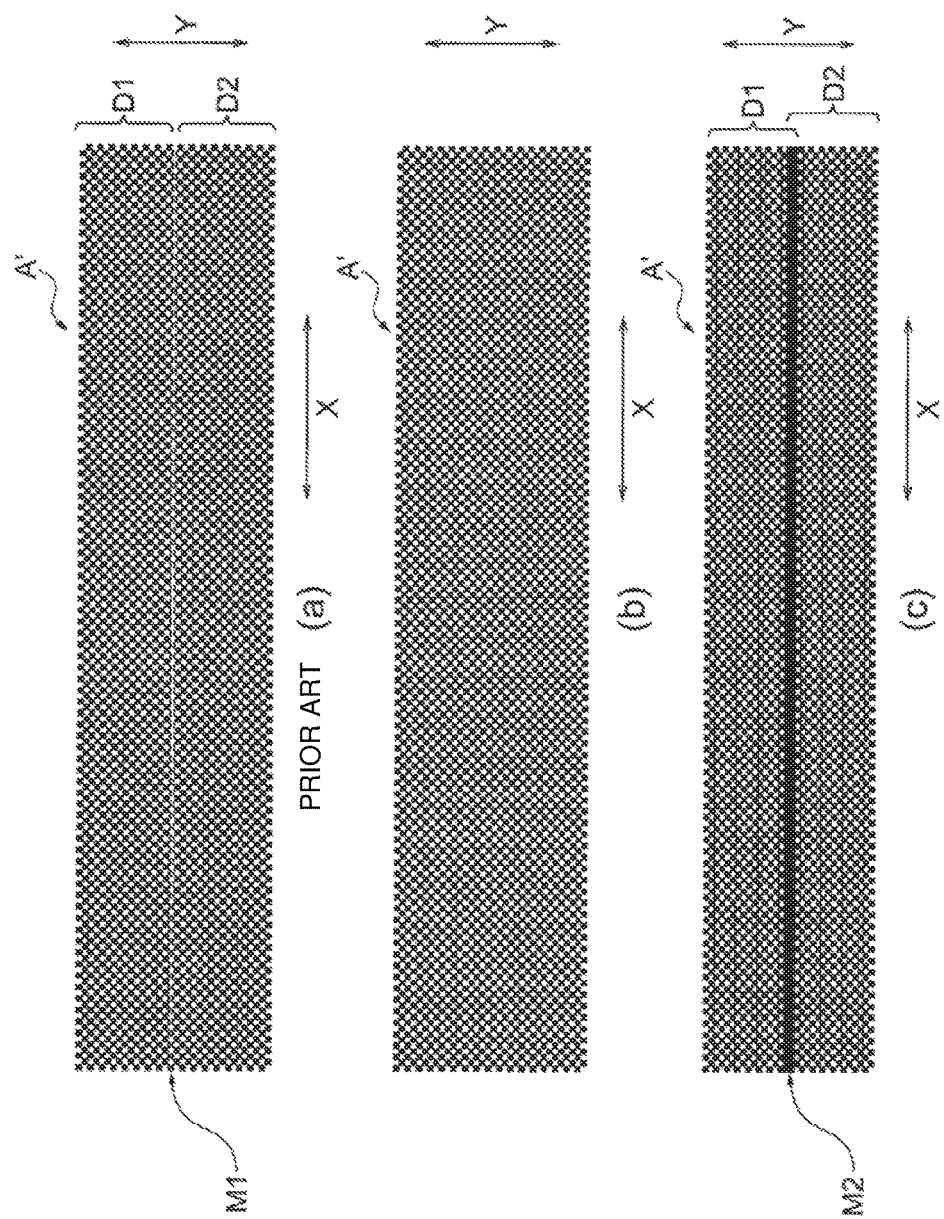

FIG. 4 illustrates an example of the surface of the rod where a streaky line appeared thereon, which impairs the decorative appearance. FIG. 4a illustrates a state where, at the border (seam) between a divided decorative layer D1 including at least the axial-direction decorative rows R1, R2 printed in the first circumferential step and a divided decorative layer D2 including at least the axial-direction decorative rows R3, R4 printed in the last circumferential step as illustrated in FIG. 2a, the edge of the divided decorative layer D1 is separated from the edge of the decorative layer D2 by a distance t1 (for instance, 2 mm) in the circumferential direction Y. As shown in FIG. 4a, the separation notably appears on the surface of the rods as a streaky line M1 extending along the axial direction X of the rods.

Whereas FIG. 4c illustrates a state where, at the border (seam) between the divided decorative layer D1 including at least the axial-direction decorative rows R1, R2 printed in the first circumferential step and the divided decorative layer D2 including at least the axial-direction decorative rows R3, R4 printed in the last circumferential step as illustrated in FIG. 2c, the edge of the divided decorative layer D1 overlaps the edge of the decorative layer D2 by a distance t1 (for instance, 2 mm) in the circumferential direction Y. As shown in FIG. 4c, the overlap notably appears on the surface of the rods as a streaky line M2 extending along the axial direction X of the rods.

Whereas when the edge of the divided decorative layer D1 and the edge of the decorative layer D2 are not separated nor overlapped from each other (the axial-direction decorative rows R2, R3 are correctively aligned in the circumferential direction) as illustrated in FIG. 2b, obviously the streaky lines M1, M2 extending along the axial direction X of the rods do not appear on the surfaces of the rods as illustrated in FIG. 4b.

FIGS. 2d to 2f show the decorative layer A according to the embodiment. Referring to FIG. 2e in which the axial-direction decorative rows are correctively arranged in the circumferential direction, the decorative layer A according to the embodiment includes covering regions 30 which are first regions to make the surface of the tubular body 20 invisible and exposing regions 32 which are second regions to make the surface of the tubular body 20 visible. The covering regions 30 and the exposing regions 32 are alternately arranged in the axial direction X and the circumferential direction Y in an argyle pattern. More specifically, the decorative layer A is formed by arranging the axial-direction decorative rows R (R1, R2, R3, R4, . . . ) in the circumferential direction Y of the tubular body 20. The axial-direction decorative row R is formed of the covering regions 30 having a shape of diamond with the identical size, which is also referred to as a first prescribed shape, and the exposing regions 32 having a substantially X with the identical size, which is also referred to as a second prescribed shape. The covering regions 30 and the exposing regions 32 are arranged alternately in the axial direction of the tubular body 20. Although the decorative layer A has the lattice-like pattern in which the covering regions 30 and the exposing regions 32, the decorative layer may have any colored lattice patterns whether the surface of the tubular body is visible or not.

In the embodiment, the covering regions 30 may be formed of a single layer of, for instance, a black colored pigment deposited in a predetermined thickness in predetermined surface areas of the tubular body 20. However, the color and type of the pigment, the thickness and the number of the layers can be adequately selected. The exposing region 32 in the embodiment is formed of a transparent or translucent layer (colored or colorless) that allows the surface of the tubular body 20 to show. However, the exposing regions 32 may be alternatively formed as openings to expose the tubular body 20 among the covering regions 30 without depositing a pigment on the outer surface of the tubular body 20. The decorative layer A may be ink-jet printed in multiple steps along the circumferential direction of the rods 3, 5, 7, and 9. For example, the axial-direction decorative row R is printed one by one or two or more rows are printed at each step. The decorative layer A may be formed on the whole or a part of the circumference of the tubular body 20.

In the embodiment, each axial-direction decorative row R (R1, R2, R3, R4, . . . ) has the exposing regions 32 which are each formed in the substantially X shape and arranged such that the covering region 30 in one axial-direction decorative row is partially situated between two axially-adjacent covering regions 30 in the next axial-direction decorative row next to the one axial-direction decorative row in the circumferential direction Y with a clearance (a portion of the exposing region 32 in the embodiment) therebetween. For instance, the axial-direction decorative row R3 has the exposing regions 32 which are each formed in the substantially X shape and arranged such that a portion P of the covering region 30 in the next axial-direction decorative rows R2, R4 in the circumferential direction Y is partially situated between the two axially adjacent covering regions 30 in the axial-direction decorative row R3 with a clearance (a portion of the exposing region 32 in the embodiment) therebetween.

In this case, the covering region 30 may have any shape other than diamonds as long as the shape has a side positioned at an angle θ with the axial direction X of the tubular body 20 in order to prevent the lines M1, M2 from appearing due to misalignment of the axial-direction decorative rows R in the circumferential direction. Preferably the covering region 30 may have a shape whose all sides are positioned at an angle θ with the axial direction X of the tubular body 20.

In the embodiment, the exposing region 32 in the decorative layer A form a crossing pattern in which lines L positioned at a predetermined angle θ with the axial direction X of the tubular body 20 intercross to each other. Moreover, the exposing regions 32 in the adjacent axial-direction decorative rows R adjacent in the circumferential direction Y are continuous to each other in the circumferential direction and form zigzag patterns extending in the circumferential direction Y and the axial direction X (GX, GY in FIG. 2d).

The sides of the diamond of the covering region 30 in the decorative layer A preferably have a length of, for example, 0.5 mm to 15 mm. Moreover, the two adjacent covering regions 30 in the axial direction X are situated a distance, for example, 1 mm to 15 mm, away from each other. How far the portion P of the covering region 30 in the axial-direction decorative row goes into the covering regions 30, 30 in the next axial-direction decorative row may be preferably set to, for example, 3% to 45% of the area of the diamond covering region 30.

Figure 5:
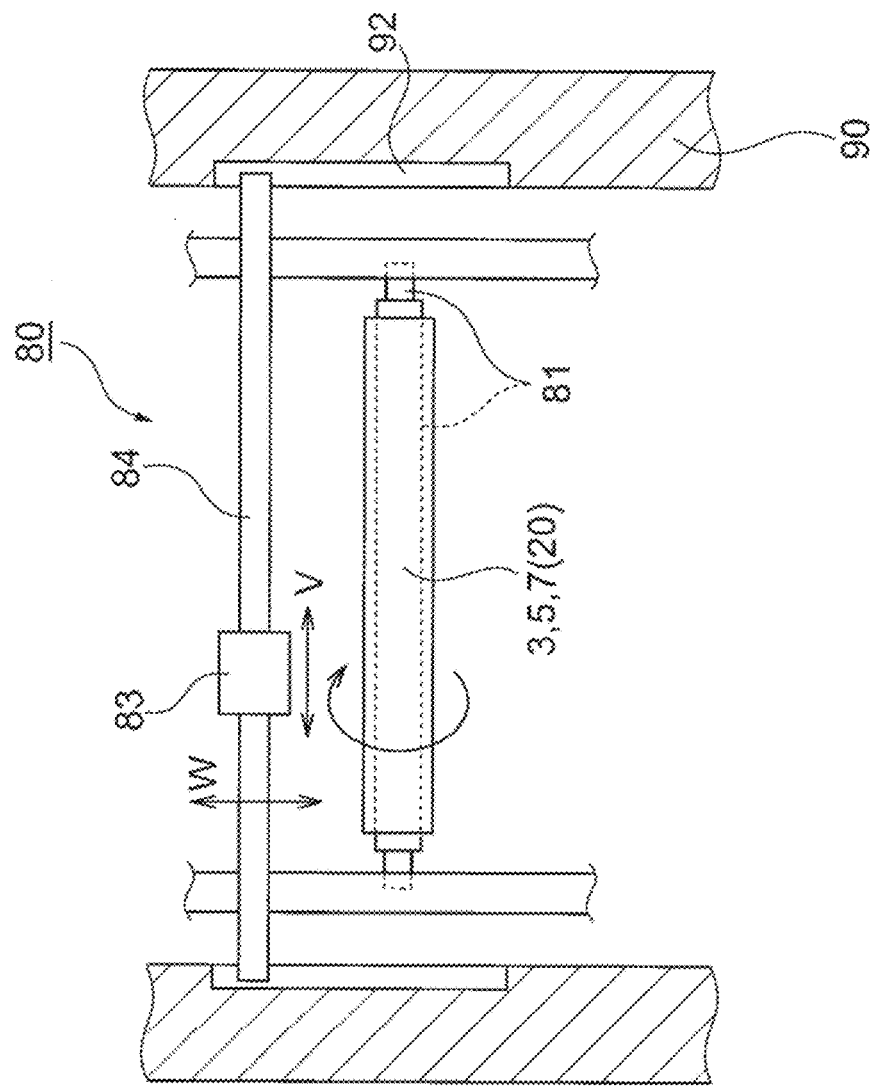
FIG. 5 is a schematic diagram showing an ink-jet printer for forming a decorative layer on the surface of the fishing rod shown in FIG. 1.

FIG. 5 schematically shows an ink-jet printer 80 for forming the decorative layer A on the outer surfaces of the tubular bodies of the rods 3, 5, 7, and 9. As shown, the ink-jet printer 80 may comprise a supporting apparatus 81 for rotatably supporting the rods 3, 5, 7, and 9 (tubular body 20). The supporting apparatus 81 may be connected to a control unit (not shown) electrically and mechanically, and the control unit may control the rotation drive. In the embodiment, the control unit may enable the rods 3, 5, 7, and 9 supported by the supporting apparatus 81 to rotate at a desired constant rate.

Further, the ink-jet printer 80 may comprise a printer head 83 that can reciprocate along the scanning direction V (that is, the axial direction of the rods 3, 5, 7, and 9 supported by the supporting apparatus 81 in the embodiment); and the printer head 83 may be provided with a large number of ink nozzles (not shown) for emitting an ink onto the outer surface of the tubular body 20; the ink nozzles are arranged in a particular array in the horizontal nozzle jet surface. Additionally, the ink-jet printer 80 may also be provided with an ultraviolet rays radiation apparatus (not shown) for curing the ink emitted onto the outer surface of the tubular body 20 with ultraviolet rays.

More specifically, the printer head 83 may be retained by a guide rail 84 above the tubular body 20 supported by the supporting apparatus 81, and can reciprocate in the scanning direction V along the guide rail 84. The guide rail 84 can move in the direction W orthogonal to the scanning direction V along, e.g., the guide grooves 92 provided in the printer housing 90 (in the direction across the circumference of the tubular body 20).

The control unit that may control the drive of the supporting apparatus 81 may control the emission of the ink from the ink nozzles, that is, the amount and timing of emission, in addition to the drive of the printer head 83, guide rail 84, and ultraviolet rays radiation apparatus. In such an ink-jet printer 80, the ink emitted from the ink nozzles of the printer head 83 may be adhered onto the outer surface of the tubular body 20 and simultaneously irradiated with ultraviolet rays from the ultraviolet rays radiation apparatus; thus, the ink adhered onto the outer surface of the tubular body 20 may be immediately cured. As mentioned above, note that the decorative layer A according to the embodiment may be formed by other methods in addition to the ink-jet printing (for instance, the ink may be fixed to the body by natural drying just like a home printer).

When the decorative layer A is formed using the ink-jet printer 80, the rods 3, 5, 7, and 9 (tubular bodies 20) may be firstly supported by the supporting apparatus 81, the guide rail 84 may be moved in the direction W and the printer head 83 may be moved in the direction V such that the printer head 83 may be positioned above the outer surface of the tubular body 20 to be provided with the decorative layer A. The printer head 83 may be then moved in the scanning direction V (the axial direction of the tubular body 20) (by a distance corresponding to an axial length over which the decorative layer A is to be formed), such that ink is discharged onto the outer surface of the tubular body 20 over a predetermined angle in the circumferential direction of the tubular body 20 to form the first divided decorative layer of the decorative layer A.

Subsequently the rods 3, 5, 7, and 9 (the tubular bodies 20) are rotated by the predetermined angle, and the printer head 83 may be again moved in the scanning direction V to discharge the ink onto an outer surface of the tubular body 20 over the predetermined angle in the circumferential direction of the tubular body 20 to form the second divided decorative layer. The above-described steps may be repeated to form the decorative layer A over the entire circumference of the tubular body 20 in a particular area of the tubular body 20.

As described above, in the embodiment, each axial-direction decorative row R (R1, R2, R3, R4, . . . ) includes the covering regions 30 and the exposing regions 32 alternately arranged along the axial direction of the tubular body 20. The exposing regions 32 are formed such that the covering region 30 in one axial-direction decorative row is partially situated between the two axially adjacent covering regions 30, 30 in the next axial-direction decorative row next to the one axial-direction in the circumferential direction with a clearance therebetween. In this manner, the axial-direction decorative rows R (R1, R2, R3, R4, . . . ) situated next to each other in the circumferential direction Y are arranged to be mixed via the covering regions 30 (the axial-direction decorative rows adjacent in the circumferential direction Y are mingled). Therefore, even if the axial-direction decorative rows R (R1, R2, R3, R4, . . . ) are separated or overlapped from each other in the circumferential direction Y due to characteristics of an ink-jet printing machine or due to axial tapering configurations of the rods 3, 5, 7, and 9 (the tubular bodies 20), the separation or the overlapped portion will not be appear as the streaky line extending along the axial direction of the rods 3, 5, 7, and 9 (the tubular bodies 20) on the surface of the rods 3, 5, 7, and 9, and borders between the axial-direction decorative rows R (R1, R2, R3, R4, . . . ) can be obscured.

FIG. 2d illustrates the state where, at the border (seam) between the divided decorative layer D1 including at least the axial-direction decorative rows R1, R2 printed in the first circumferential step and the divided decorative layer D2 including at least the axial-direction decorative rows R3, R4 printed in the last circumferential step, the edge of the divided decorative layer D1 is separated from the edge of the divided decorative layer D2 by a distance t1 (for instance, 2 mm) in the circumferential direction Y. However, at the border, each covering region 30 in the axial-direction decorative row R3 is partially situated between the two adjacent covering regions 30, 30 in the axial-direction decorative row R2 with a clearance therebetween. In other words, the axial-direction decorative rows R2, R3 are mixed up together via the covering regions 30 (the axial-direction decorative rows R2, R3 are mingled in the circumferential direction Y) so that the separation in the circumferential direction between the axial-direction decorative rows R2, R3 does not stand out.

FIG. 2f illustrates the state where, at the border (seam) between the divided decorative layer D1 including at least the axial-direction decorative rows R1, R2 printed in the first circumferential step and the divided decorative layer D2 including at least the axial-direction decorative rows R3, R4 printed in the last circumferential step, the edge of the divided decorative layer D1 is overlapped with the edge of the decorative layer D2 by a distance t1 (for instance, 2 mm) in the circumferential direction Y. Even in this case, at the border, each covering region 30 in the axial-direction decorative row R3 is partially situated between the two adjacent covering regions 30, 30 in the axial-direction decorative row R2 with a clearance interposed therebetween. In other words, the axial-direction decorative rows R2, R3 are mixed up together via the covering regions 30 (the axial-direction decorative rows R2, R3 are mingled in the circumferential direction Y) so that the overlap between the axial-direction decorative rows R2, R3 in the circumferential direction does not stand out.

Figure 3:
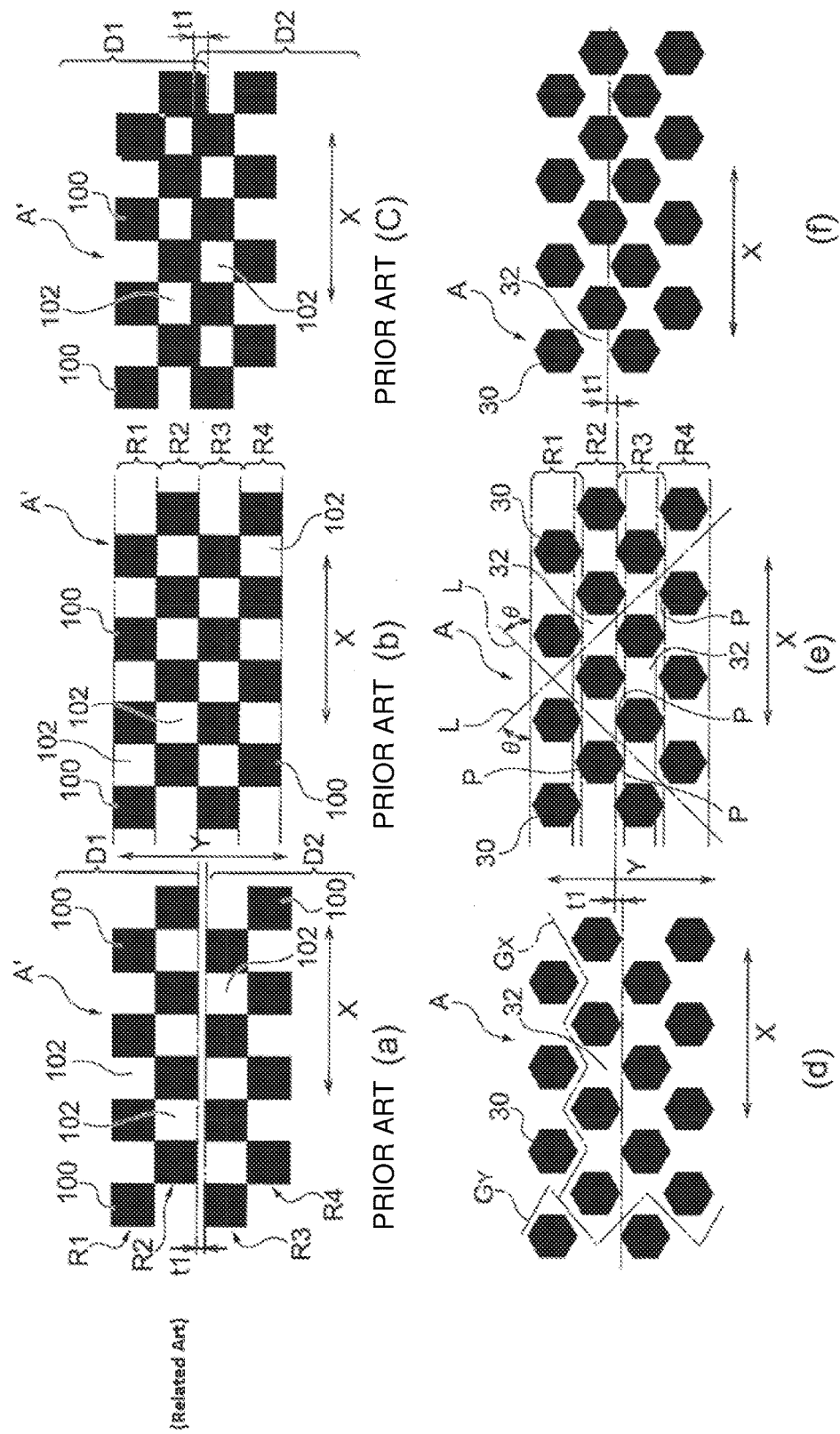
FIGS. 3a-3f illustrates another example of the decorative layer which may be provided on the outer surface of the fishing rod of FIG. 1.

Note that the shape of the covering region 30 may be a polygon, circle, ellipse or the like in addition to a diamond. FIGS. 3d to 3e illustrate a second embodiment of the decorative layer A in which the covering region 30 has a hexagonal shape. Referring to FIGS. 3d to 3e, the decorative layer A according to this embodiment includes covering regions 30 to make the surface of the tubular body 20 invisible and exposing regions 32 to make the surface of the tubular body 20 visible. The covering regions 30 and the exposing regions 32 are alternately arranged in the axial direction X and the circumferential direction Y in a lattice-like pattern. More specifically, the decorative layer A is formed by arranging the axial-direction decorative rows R (R1, R2, R3, R4, . . . ) in the circumferential direction Y of the tubular body 20. The axial-direction decorative row R is formed of the covering regions 30 (colored layers) having a hexagonal shape with the identical size, which is also referred to as a first prescribed shape, and the exposing regions 32 (transparent layers, translucent layers, or simply openings) having irregular squires (a square with V-shaped branches from their opposite sides in the circumferential direction) with the identical size, which is also referred to as a second prescribed shape. The covering regions 30 and the exposing regions 32 are arranged alternately in the axial direction of the tubular body 20.

In the embodiment, each axial-direction decorative row R (R1, R2, R3, R4, . . . ) has the exposing regions 32 which are each formed in a substantially X shape and arranged such that the covering region 30 in the axial-direction decorative row is partially situated between two axially adjacent covering regions 30, 30 in the next axial-direction decorative row in the circumferential direction Y with a clearance (a portion of the exposing region 32 in the embodiment) interposed therebetween. For instance, the axial-direction decorative row R3 has the exposing regions 32 which are each formed in the irregular square shape and arranged such that a portion P of the covering region 30 in the next axial-direction decorative rows R2, R4 in the circumferential direction Y is partially situated between the two axially adjacent covering regions 30, 30 in the axial-direction decorative row R3 with a clearance (a portion of the exposing region 32 in the embodiment) therebetween.

In this case, the covering regions 30 have the shape whose all sides are positioned at a prescribed angle θ with the axial direction X of the tubular body 20. In the embodiment, the exposing regions 32 form a crossing pattern as a whole in which lines L positioned at a predetermined angle θ with the axial direction X of the tubular body 20 intercross to each other. Moreover, the exposing regions 32 in the adjacent axial-direction decorative rows R adjacent in the circumferential direction Y are continuous to each other in the circumferential direction and form zigzag patterns extending in the circumferential direction Y and the axial direction X (GX, GY in FIG. 3d).

The sides of the diagonal shape of the covering region 30 in the decorative layer A preferably have a length of, for example, 0.5 mm to 15 mm. Moreover, the two adjacent covering regions 30 in the axial direction X are situated at a distance, for example, 1 mm to 15 mm, away from each other. How far the portion P of the covering region 30 in the axial-direction decorative row goes into the covering regions 30, 30 in the next axial-direction decorative row may be preferably set to, for example, 3% to 45% of the area of the diagonal covering region 30.

Accordingly, the embodiment may produce the same effect as the first embodiment. As illustrated in FIG. 3d, even if, at the border (seam) between the divided decorative layer D1 (R1, R2, . . . ) and the divided decorative layer D2 (R3, R4, . . . ), the edge of the divided decorative layer D1 is separated from the edge of the decorative layer D2 by a distance t1 (for instance, 2 mm) in the circumferential direction Y, the covering region 30 in the axial-direction decorative row R3 is partially situated between the two axially adjacent covering regions 30, 30 in the axial-direction decorative row R2 with a clearance interposed therebetween at the border. In other words, the axial-direction decorative rows R2, R3 are mixed up together via the covering regions 30 (the axial-direction decorative rows R2, R3 are mingled in the circumferential direction Y) so that the separation in the circumferential direction between the axial-direction decorative rows R2, R3 does not stand out.

As illustrated in FIG. 3f, even if, at the border (seam) between the divided decorative layer D1 (R1, R2, . . . ) and the divided decorative layer D2 (R3, R4, . . . ), the edge of the divided decorative layer D1 is overlapped with the edge of the decorative layer D2 by a distance t1 (for instance, 2 mm) in the circumferential direction Y, the covering region 30 in the axial-direction decorative row R3 is partially situated between the two axially adjacent covering regions 30, 30 in the axial-direction decorative row R2 with a clearance therebetween at the border. In other words, the axial-direction decorative rows R2, R3 are mixed up together via the covering regions 30 (the axial-direction decorative rows R2, R3 are mingled in the circumferential direction Y) so that the overlap between the axial-direction decorative rows R2, R3 in the circumferential direction does not stand out.

The present invention is not limited to the above embodiment but is capable of various modification within the purport thereof. For instance, although the decorative layer A is provided to the fishing rod 1 in the above-described embodiments, the decorative layer A may be applied to any tubular body other than the fishing rod. Although the decorative layer has the lattice-like pattern of the covering regions and the exposing regions, the decorative layer may have any colored lattice patterns whether the surface of the tubular body is visible or invisible. In other words, the decorative layer according to the invention may have any lattice-like pattern in which the first regions of a first color and the second regions of a second color that is different from the first color are alternately arranged in the axial and circumferential directions of the tubular body. Moreover, any color may be selected for the first regions and the second regions, including transparent, translucent, and opaque colors.

What is claimed is:
1. A tubular structure comprising:
a tubular body extending in an axial direction, the axial direction being defined by a center axis extending through a center of the tubular body; and
a decorative layer formed on a surface of the tubular body in a prescribed portion, the decorative layer having a lattice-like pattern in which first regions of a first color and second regions of a second color different from the first color are alternately arranged in the axial direction and a circumferential direction of the tubular body, wherein the decorative layer includes axial-direction decorative rows arranged in the circumferential direction of the tubular body, each of the axial-direction decorative rows includes the first regions having a first prescribed shape and the second regions having a second prescribed shape that are alternately arranged along the axial direction of the tubular body, and the second regions in each of the axial-direction decorative rows are formed such that one of the first regions in one axial-direction decorative row of the axial-direction decorative rows has a portion that is partially situated between two axially-adjacent first regions of the first regions in a next axial-direction decorative row of the axial-direction decorative rows adjacent to the one axial-direction decorative row in the circumferential direction with a clearance between the one first region in said one axial-direction decorative row and the two axially-adjacent first regions in said next axial-direction decorative row, wherein the portion is defined as being between (a) a first axial line extending in the axial direction that only intersects edges of the first prescribed shapes of the first regions in the next axial-direction decorative row and intersects the first prescribed shapes of the first regions in the one axial-direction decorative row and (b) a second axial line extending in the axial direction that only intersects edges of the first prescribed shapes of the first regions in the one axial-direction decorative row and intersects the first prescribed shapes of the first regions in the next axial-direction decorative row, both the first axial line and the second axial line being parallel to the center axis.

2. The tubular structure of claim 1, wherein the first regions are covering regions that make the surface of the tubular body invisible and the second regions are exposing regions that make the surface of the tubular body visible.

3. The tubular structure of claim 1, wherein the first shape of the first regions includes a side positioned at a prescribed angle with the axial direction of the tubular body.

4. The tubular structure of claim 1, wherein all sides of the first shape of the first regions are positioned at a prescribed angle with the axial direction of the tubular body.

5. The tubular structure of claim 1, wherein the first shape of the first regions is one selected from the group consisting of a diamond and a polygon.

6. The tubular structure of claim 1, wherein the second regions in the decorative layer collectively form a crossing pattern in which lines positioned at a predetermined angle with the axial direction of the tubular body cross each other.

7. The tubular structure of claim 1, wherein the second regions in adjacent axial-direction decorative rows of the axial-direction decorative rows in the circumferential direction are continuous to each other in the circumferential direction to form zigzag patterns extending in the circumferential direction and the axial direction.

8. The tubular structure of claim 1, wherein the decorative layer is formed over an entire circumference of the tubular body.

9. The tubular structure of claim 1, wherein the tubular body is a rod of a fishing rod.

10. The tubular structure claim 1, wherein the decorative layer is formed by ink jet printing.

* * * * *